(12) United States Patent
Kruempelmann et al.

(10) Patent No.: US 12,455,943 B2
(45) Date of Patent: Oct. 28, 2025

(54) INTELLIGENT CONFIGURATION HANDLER

(71) Applicant: SAP SE, Walldorf (DE)

(72) Inventors: Wulf Kruempelmann, Altlussheim (DE); Susanne Schott, Walldorf (DE)

(73) Assignee: SAP SE, Walldorf (DE)

( * ) Notice: Subject to any disclaimer, the term of this patent is extended or adjusted under 35 U.S.C. 154(b) by 57 days.

(21) Appl. No.: 18/494,490

(22) Filed: Oct. 25, 2023

(65) Prior Publication Data
US 2025/0139202 A1  May 1, 2025

(51) Int. Cl.
*G06F 16/20* (2019.01)
*G06F 16/22* (2019.01)
*G06F 16/242* (2019.01)
*G06F 18/22* (2023.01)

(52) U.S. Cl.
CPC ............ *G06F 18/22* (2023.01); *G06F 16/22* (2019.01); *G06F 16/2433* (2019.01)

(58) Field of Classification Search
CPC .............................. G06F 16/22; G06F 16/2433
See application file for complete search history.

(56) References Cited

U.S. PATENT DOCUMENTS

| | | | | |
|---|---|---|---|---|
| 11,716,259 | B2* | 8/2023 | Bhattacharya | H04L 41/5058 709/223 |
| 2007/0157185 | A1* | 7/2007 | Semerdzhiev | G06F 9/455 717/148 |
| 2007/0162892 | A1* | 7/2007 | Zenz | G06F 9/44505 717/121 |
| 2017/0155631 | A1* | 6/2017 | Du | G06F 21/6209 |
| 2017/0295084 | A1* | 10/2017 | Ramanath | H04L 43/0876 |
| 2017/0329818 | A1* | 11/2017 | Le Cam | G06F 16/22 |
| 2019/0384630 | A1* | 12/2019 | Hoke | G06F 9/5038 |
| 2020/0183934 | A1* | 6/2020 | Mathur | G06F 16/2272 |
| 2021/0377364 | A1* | 12/2021 | Kruempelmann | G06F 16/2282 |

OTHER PUBLICATIONS

Article entitled "SQL LIKE Operator", by W3 Schools, dated Oct. 1, 2022 (Year: 2022).*
Article entitled "Attempting to Replace Function on SQL but with Wildcards", by Theo, dated Nov. 25, 2021 (Year: 2021).*

* cited by examiner

*Primary Examiner* — Mahesh H Dwivedi
(74) *Attorney, Agent, or Firm* — Mintz Levin Cohn Ferris Glovsky and Popeo, P.C.

(57) ABSTRACT

Arrangements for configuration changes using a wildcard engine are provided. A data pattern group associated with one or more configuration sets may be generated. The data pattern group may include data patterns with one or more wildcard characters. An input selection may be received. Values for the data pattern group associated with the one or more configuration sets may be selected based on the input selection. The one or more templates associated with the data pattern group may be modified by applying the selected values to the one or more templates. Old data patterns may be automatically replaced with new data patterns. The modified one or more templates associated with the data pattern group may be activated via a template engine and stored in a database.

17 Claims, 5 Drawing Sheets

INTELLIGENT CONFIGURATION HANDLER

TECHNICAL FIELD

The subject matter described herein relates generally to data processing and more specifically to an intelligent configuration handler. In some examples, the configuration handler may intelligently handle configuration settings using a wildcard engine.

BACKGROUND

Configuration of enterprise resource planning (ERP) system settings are generally implemented via templates. For example, if a developer is working with account numbers, all templates for all account numbers might be activated for use. During system upgrades, corresponding tables with configuration data might be changed. Typically, the developer must directly program each change case individually. For example, each source value in a table is matched with a target value, often resulting in a considerably large table used in a data exchange process. This individual coding of the software changes is inefficient and error prone.

SUMMARY

Methods, systems, and articles of manufacture, including computer program products, are provided for an intelligent configuration handler. In one aspect, there is provided a system including at least one processor and at least one memory. The at least one memory can store instructions that cause operations when executed by the at least one processor. The operations may include: generating a data pattern group associated with one or more configuration sets, and the data pattern group may include data patterns with one or more wildcard characters; receiving an input selection including a table name and data pattern information; selecting values for the data pattern group associated with the one or more configuration sets based on the input selection; generating modifications to one or more templates associated with the data pattern group by applying the selected values to the one or more templates, including automatically replacing an old data pattern with a new data pattern; activating, via a template engine, the modified one or more templates associated with the data pattern group; and storing the modified one or more templates in a database.

In some variations, one or more of the features disclosed herein including the following features can optionally be included in any feasible combination. In some variations, receiving the input selection may include receiving input from a user device.

In some variations, receiving the input selection may include receiving input via a structured query language expression. In some variations, the structured query language expression may include a SELECT condition.

In some variations, selecting values for the data pattern group may include selecting values from a table including key fields. In addition, the key fields may identify unique records for a table row.

In some variations, the data pattern group may include data patterns with a wildcard character at one or more of: a beginning position, a middle position, or an ending position, of a data pattern.

In some variations, the one or more configuration sets may include business configuration data.

In some variations, the one or more templates associated with the data pattern group may include configuration templates including predefined instance configurations for specific scenarios.

In some variations, the operations may further include converting the data pattern group into a predefined format, and storing the data pattern group in the database.

In another aspect, there is provided a method for centralized configuration of enterprise software applications. The method may include: generating a data pattern group associated with one or more configuration sets, and the data pattern group may include data patterns with one or more wildcard characters; receiving an input selection including a table name and data pattern information; selecting values for the data pattern group associated with the one or more configuration sets based on the input selection; generating modifications to one or more templates associated with the data pattern group by applying the selected values to the one or more templates, including automatically replacing an old data pattern with a new data pattern; activating, via a template engine, the modified one or more templates associated with the data pattern group; and storing the modified one or more templates in a database.

In some variations, one or more of the features disclosed herein including the following features can optionally be included in any feasible combination. In some variations, receiving the input selection may include receiving input from a user device.

In some variations, receiving the input selection may include receiving input via a structured query language expression. In some variations, the structured query language expression may include a SELECT condition.

In some variations, selecting values for the data pattern group may include selecting values from a table may include key fields. In addition, the key fields may identify unique records for a table row.

In some variations, the data pattern group may include data patterns with a wildcard character at one or more of: a beginning position, a middle position, or an ending position, of a data pattern.

In some variations, the one or more configuration sets may include business configuration data.

In some variations, the one or more templates associated with the data pattern group may include configuration templates including predefined instance configurations for specific scenarios.

In some variations, the method may further include converting the data pattern group into a predefined format, and storing the data pattern group in the database.

In another aspect, there is provided a computer program product that includes a non-transitory computer readable medium. The non-transitory computer readable medium may store instructions that cause operations when executed by at least one data processor. The operations may include: generating a data pattern group associated with one or more configuration sets, and the data pattern group may include data patterns with one or more wildcard characters; receiving an input selection including a table name and data pattern information; selecting values for the data pattern group associated with the one or more configuration sets based on the input selection; generating modifications to one or more templates associated with the data pattern group by applying the selected values to the one or more templates, including automatically replacing an old data pattern with a new data pattern; activating, via a template engine, the modified one or more templates associated with the data pattern group; and storing the modified one or more templates in a database.

In some variations, one or more of the features disclosed herein including the following features can optionally be included in any feasible combination. In some variations, receiving the input selection may include receiving input via a structured query language expression.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, like labels are used to refer to same or similar items in the drawings.

DETAILED DESCRIPTION

Aspects of the disclosure provide effective, efficient, scalable, and convenient technical solutions that address and overcome the technical problems associated with intelligent handling of configuration changes. More specifically, aspects of the disclosure provide a wildcard engine for pattern exchange. Aspects of the disclosure may activate a template or a set of templates using one or more wildcards. A wildcard engine may replace wildcards with a set of other wildcard rules for configuration changes. Additional aspects of the disclosure may use a structured query language (SQL) SELECT clause to retrieve a list of values for a data exchange process. These and various other arrangements will be discussed more fully below.

Figure 1:
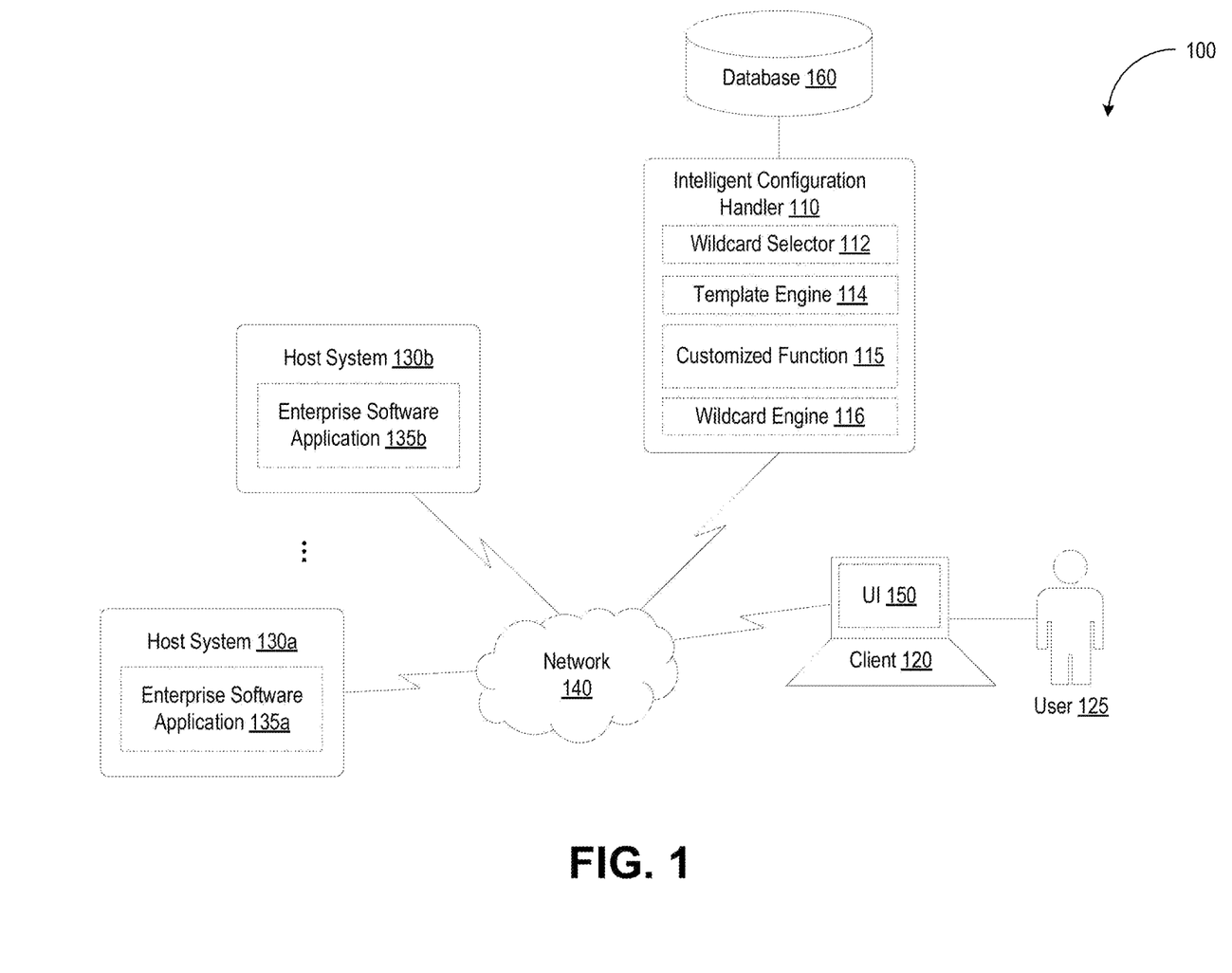
FIG. 1 depicts an illustrative computing environment for intelligent handling of configuration changes using a wildcard engine in accordance with some example embodiments.

FIG. 1 depicts an illustrative configuration system 100 for intelligent handling of configuration changes using a wildcard engine in accordance with some example embodiments. Referring to FIG. 1, the configuration system 100 may include an intelligent configuration handler 110 and a client 120. The configuration system 100 may further include a plurality of host systems including, for example, a first host system 130a, a second host system 130b, and/or the like. As shown in FIG. 1, the intelligent configuration handler 110, the client 120, the first host system 130a, and the second host system 130b may be communicatively coupled via a network 140. The network 140 may be a wired and/or wireless network including, for example, a wide area network (WAN), local area network (LAN), a virtual local area network (VLAN), the Internet, and/or the like. Meanwhile, the first host system 130a and/or the second host system 130b may be cloud-based systems hosted on one or more cloud-computing platforms.

Referring again to FIG. 1, the intelligent configuration handler 110 may include one or more computing devices configured to perform one or more of the functions described herein. In some example embodiments, the intelligent configuration handler 110 may further include a wildcard selector 112, a template engine 114, and a wildcard engine 116. The wildcard selector 112 may receive manual or automated input. In some examples, the input may be and/or include manual input from a user (e.g., user 125 of client 120). Additionally or alternatively, the input may be and/or include input from an automated engine. For example, wildcard selector 112 may receive data from an automated process during an upgrade. The input may be and/or include a table name and data pattern information. The template engine 114 may perform logical operations on the templates. The wildcard engine 116, communicatively coupled to wildcard selector 112 and template engine 114, may orchestrate the execution of a data exchange using defined patterns and associated rules on handling the patterns.

In some example embodiments, the intelligent configuration handler 110 may centralize the configuration of multiple enterprise software applications, including enterprise software applications distributed across different host systems. For example, as shown in FIG. 1, a user 125 at the client 120 may interact with the intelligent configuration handler 110 in order to customize a first enterprise software application 135a deployed at the first host system 130a as well as a second enterprise software application 135b deployed at the second host system 130b. The first enterprise software application 135a and/or the second enterprise software application 135b may be an enterprise resource planning (ERP) software application, a customer relationship management (CRM) software application, and/or the like. The user 125 may customize the first enterprise software application 135a and the second enterprise software application 135b in order to implement a customized function 115 requiring the first enterprise software application 135a as well as the second enterprise software application 135b.

In some example embodiments, in order to implement the customized function 115, the user 125 may interact with the intelligent configuration handler 110 via a user interface 150 presented at the client 120. The user interface 150 may be configured to receive, from the user 125, one or more inputs scoping the customized function 115. For example, the user interface 150 may be configured to receive, from the user 125 at the client 120, a first input selecting a function. Moreover, the user interface 150 may be configured to receive, from the user 125 at the client 120, a second input specifying one or more customizations that are applied to the selected function to generate the customized function 115. It should be appreciated that the intelligent configuration handler 110 may be configured to generate a series of queries for scoping the customized function 115. As such, the first input and/or the second input may be responses to the queries generated by the intelligent configuration handler 110 and displayed at the user interface 150.

Examples of the customized function 115 may include billing, invoicing, procurement, payroll, time and attendance management, recruiting and onboarding, learning and development, performance and compensation, and workforce planning. In order to accomplish the customized function 115, the first enterprise software application 135a and the second enterprise software application 135b may operate on the same data. Accordingly, the first enterprise software application 135a and the second enterprise software application 135b may each be implemented based on a template. The template may define the manner in which data is stored in one or more database tables operated upon by the first enterprise software application 135a and the second enterprise software application 135b while performing the customized function 115. For instance, the template may specify the columns that form the entries occupying the rows in each one of the database tables operated upon by the first enterprise software application 135a and the second enterprise software application 135b while performing the customized function 115.

In some example embodiments, the intelligent configuration handler 110 may maintain (e.g., store) configuration data (e.g., for an enterprise software application, such as the first enterprise software application 135a, the second enterprise software application 135b, and/or the like) in one or more database tables at a database 160 coupled with the intelligent configuration handler 110.

Figure 2:
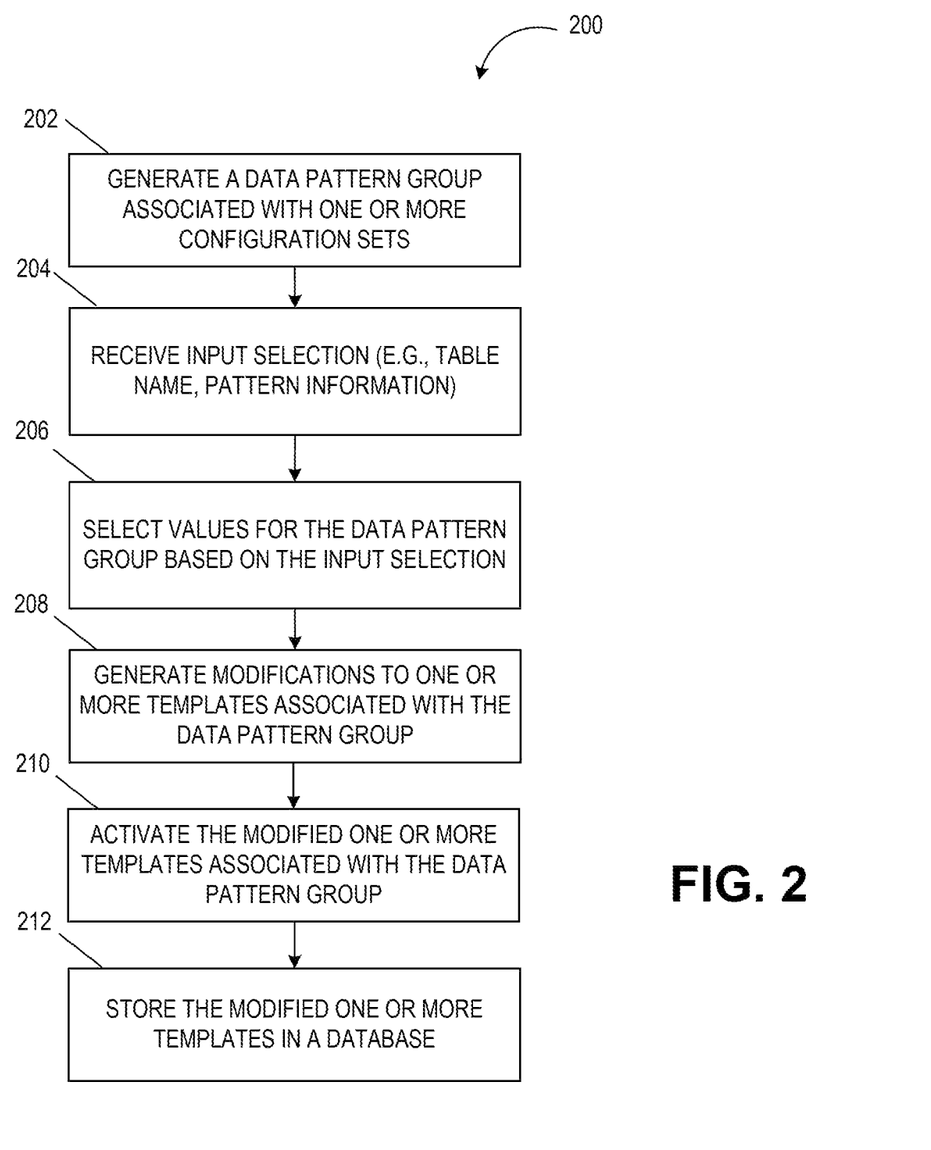
FIG. 2 depicts a flowchart illustrating a process for intelligent handling of configuration changes using a wildcard engine, in accordance with some example embodiments.

FIG. 2 depicts a flowchart illustrating a process for intelligent handling of configuration changes using a wildcard engine. With reference to FIG. 2, at step 202, intelligent configuration handler 110 may generate a data pattern group associated with one or more configuration sets (e.g., business configuration data). In some examples, the data pattern group may include data patterns with one or more wildcards (e.g., wildcard characters). Wildcard characters may be used to specify a pattern, which may include literal and/or variable elements. A wildcard character may be used to substitute one or more characters in a string. In some examples, the percent sign ("%") wildcard character may indicate any string of zero or more characters. A string may be matched with a number of wildcard characters. In addition, the wildcard characters may be at one or more of a beginning position, a middle position, or an ending position, of a data pattern. For example, to return records that start with a specific letter or phrase, the percent sign ("%") may be added at the end of the letter or phrase (e.g., a %). Additionally or alternatively, to return records that end with a specific letter or phrase, the "%" sign may be added at the beginning of the letter or phrase (e.g., % b). Additionally or alternatively, to return records that start with and end with a specific letter or phrase, the "%" sign may be added to the middle of the letter or phrase (e.g., "a % b"). In some examples, the wildcard (e.g., "%") may be combined with other wildcard characters (e.g., an underscore wildcard character ("_") representing a single character, a bracketed character ("[ ]") representing any single character within the brackets, a caret wildcard character ("^") representing any character not in the brackets).

In some embodiments, intelligent configuration handler 110 may convert the data pattern group into a predefined format and store the data pattern group in a database (e.g., database 160).

At step 204, intelligent configuration handler 110 may receive an input selection (e.g., via wildcard selector 112). The input may be and/or include a table name and data pattern information (e.g., a list of data or data patterns). In some examples, intelligent configuration handler 110 may receive the input selection from a user device (e.g., client 120). Additionally or alternatively, the input may be from an automated engine. For example, intelligent configuration handler 110 may receive data from an automated process during an upgrade. In some examples, intelligent configuration handler 110 may receive the input selection via a structured query language expression or query (e.g., a SELECT condition that queries data from a database).

At step 206, intelligent configuration handler 110 may select values for the data pattern group associated with the one or more configuration sets based on the input selection. For example, intelligent configuration handler 110 may select values from a table including key fields that identify unique records for a table row. For example, an SQL SELECT statement may be used to select data from a database (e.g., "SELECT column 1, column 2, . . . FROM table_name" where "column 1, column 2, . . . " are the field names of the table to select data from, and the "tablename" represents the name of the table to select data from). In some examples, "SELECT *" command may be used for returning all columns without specifying every column name. The SQL LIKE operator may be used in a WHERE clause to search for a specified pattern in a column.

One non-limiting syntax example, values in database tables that are to be exchanged with other values might be selected as follows: SELECT column 1, column 2, . . . FROM table_name WHERE column_N LIKE pattern. For instance, to find all usernames that have characters "ann" in them (e.g., "Kruempelmann"), the following syntax may be used: SELECT * FROM Users WHERE Username LIKE "% ann %." In some examples, any number of conditions may be combined using AND or OR operators. In some examples, trailing blanks following the "%" in a like clause may be truncated to a single trailing blank. For example, "%" followed by two spaces matches "X[ ]" (one space); "X[ ][ ]" (two spaces); "X[ ][ ][ ]" (three spaces), or any number of trailing spaces.

At step 208, intelligent configuration handler 110 may generate modifications to one or more templates associated with the data pattern group by applying the selected values to the one or more templates (e.g., configuration templates including predefined instance configurations for specific scenarios). For example, intelligent configuration handler 110 may automatically replace an old data pattern with a new data pattern (e.g., by selecting values for a wildcard group and looping over all values of the group). To further illustrate, reference is now made to FIGS. 3A and 3B, which depict block diagrams 310, 320 for intelligent handling of configuration changes using a wildcard engine in accordance with some example embodiments.

Figure 3A:
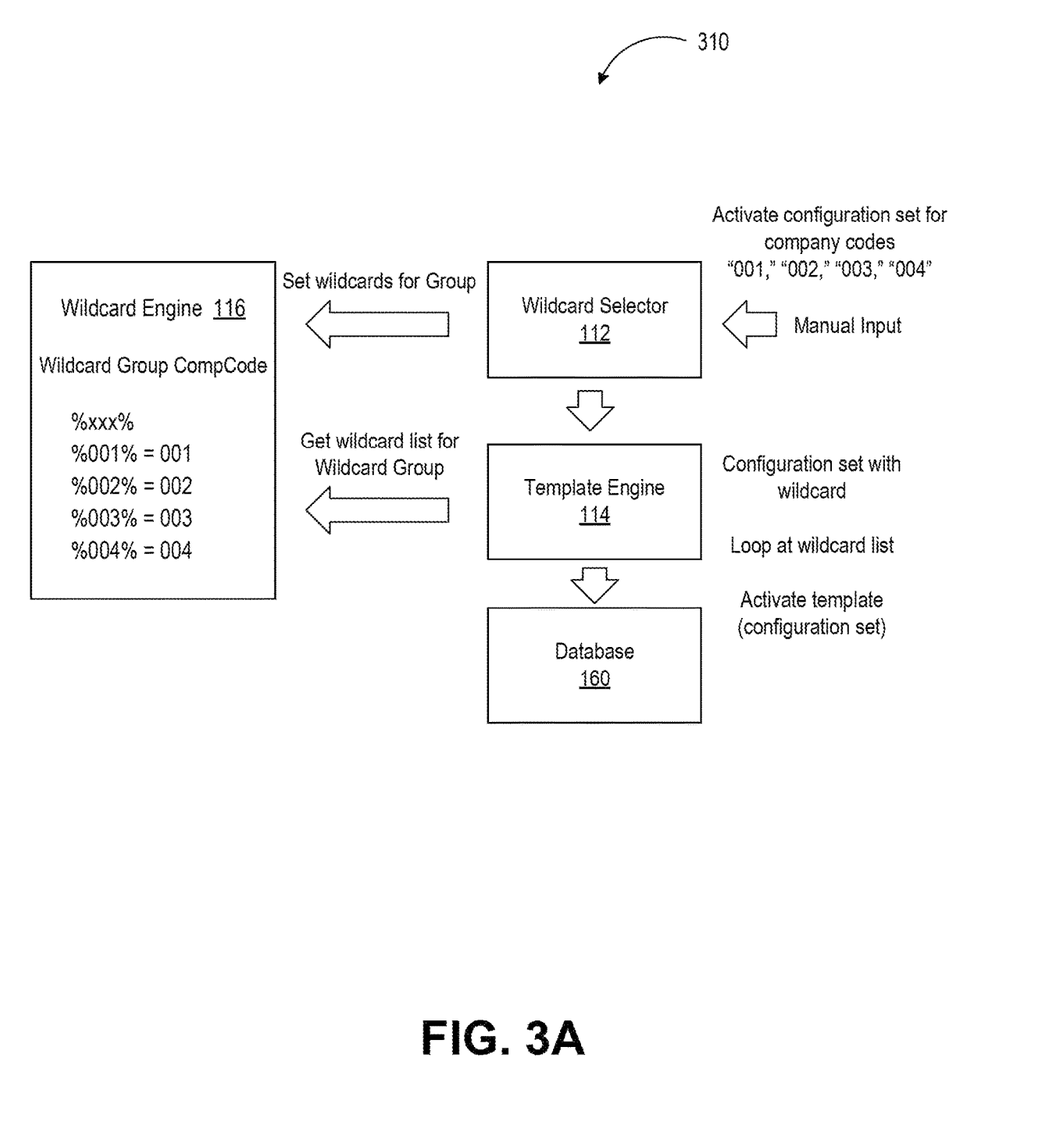
FIG. 3A depicts an illustrative block diagram for intelligent handling of configuration changes using a wildcard engine, in accordance with some example embodiments.

In one non-limiting example, as illustrated in FIG. 3A, intelligent configuration handler 110 may be used to activate templates in business configuration sets (e.g., "BC Sets"). A business configuration set may act as a template delivery tool that allows users to record, save, and share customization settings. Business configuration sets are a snapshot of customization settings that can be used later as template or customization backup. When a business configuration set is created, values from original customizing tables are copied into the business configuration set. When the business configuration set is activated in another system, the values stored in the business configuration set are copied to corresponding customizing tables of the system. After activating a business configuration set, the values in the business configuration set are available in the system. The new or changed data records are written into a change request, which can transport the data into a production system. In one example, a business configuration set is an XML file whose structure is determined by a schema file. A business configuration set defines the value for each node's attributes in the XML file and loads these values into tables in an Enterprise Resource Planning (ERP) system.

Referring to FIG. 3A, business configuration sets with company codes "% xxx %" may be defined. A template or a set of templates may be activated using one or more wildcards. To activate a set of templates for a set of company codes (e.g., referring to the smallest organizational unit used to represent a company for accounting), a user (e.g., user 125) may select a business configuration set (e.g., "% xxx %") and the list of company codes (e.g., "001," "002," "003," "004") as an input selection to the wildcard selector 112. The company codes may be stored in a wildcard group (e.g., group "CompCode") in wildcard engine 116. The template engine 114 may search the business configuration set (e.g., parse the source code) for strings which might be replaced (e.g., "% xxx %"). The wildcard engine 116 queries the wildcard selector 112 for the input selection. The wildcard selector 112 provides the user-managed input (e.g., company codes "001," "002," "003," "004") to the template engine 114. The template engine 114 retrieves the content/values of the wildcard group (e.g., wildcard group "CompCode") and calls an activation engine/tool (e.g., BC Set tool), which writes the data to the database 160. It will be appreciated that other and/or different wildcard groups may also be generated. For example, wildcard group "% xxx+1%" may be generated such that "001" is replaced with "002", "002" is replaced with "003," "003" is replaced with "004," and so forth. Additionally or alternatively, more than one wildcard group may be generated (e.g., one for each of different requirements).

Figure 3B:
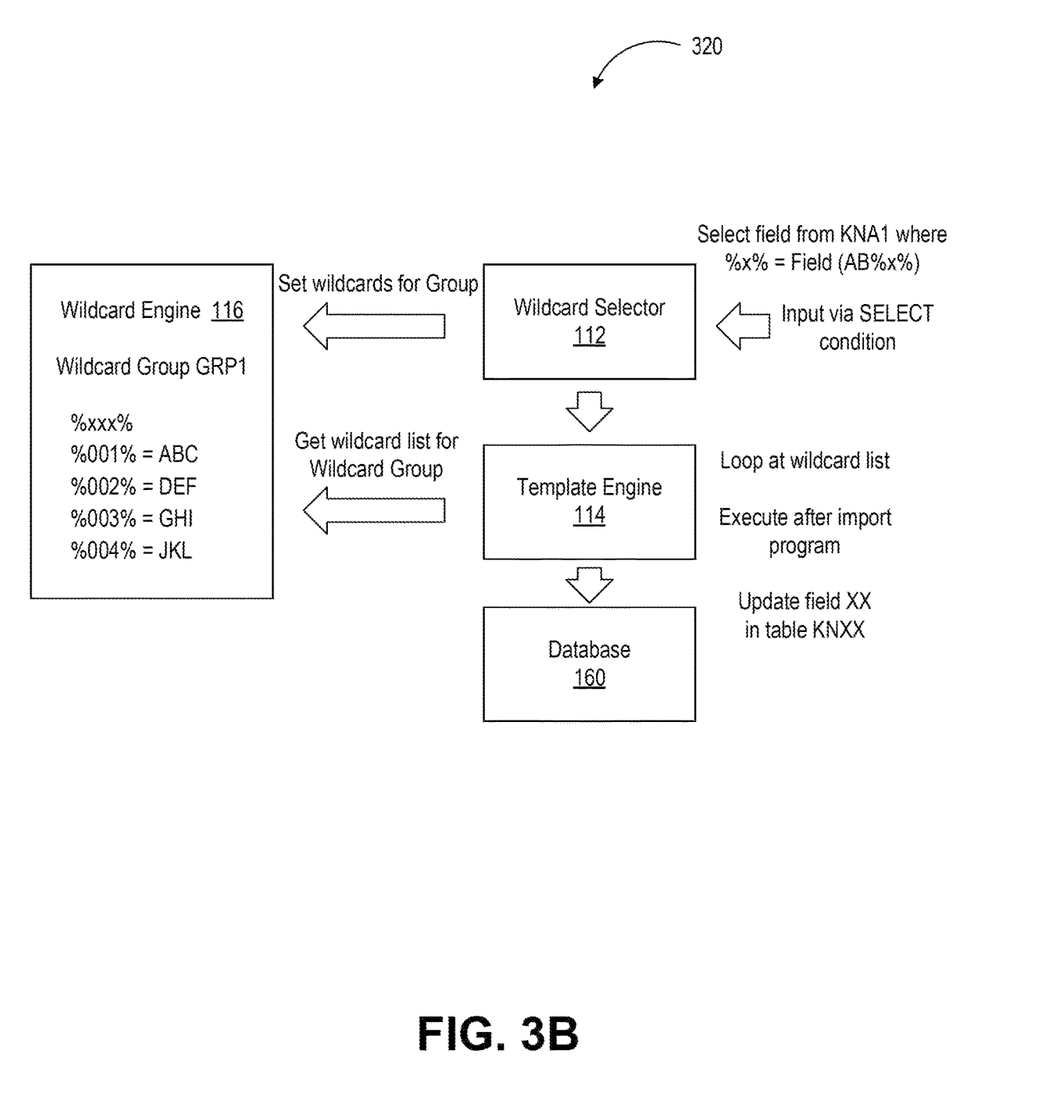
FIG. 3B depicts an illustrative block diagram for intelligent handling of configuration changes using a wildcard engine, in accordance with some example embodiments.

In a further non-limiting example, shown in FIG. 3B, intelligent configuration handler 110 may be implemented with execution of programs after import (e.g., XPRA). An execution of programs after import object may be and/or include a method configured to modify one or more databases so that the database(s) are compatible with, for example, a system upgrade. Initially, a user (e.g., developer) may define a wildcard group ("% xxx %"), which retrieves values from a table. Input data may be automatically selected via an SQL SELECT condition. For example, the wildcard selector 112 may select from a table "KNA1," all fields which have the string "AB % x %" (e.g., a pattern in the table with the field "AB") and retrieve the values. In some examples, the table (e.g., table "KNA1") may be a table in an enterprise resource planning (ERP) system which stores general customer master data (e.g., names, addresses, and/or the like, which may be valid cross-company). The wildcard engine 116 may define values that are to be exchanged (e.g., "%001%=ABC," "%002%=DEF," "%003%=GHI," "%004%=JKL"). These values, which are from a first table (e.g., table "KNA1"), may be used as input for action (e.g., execution of processes) on a second table (e.g., new table "KNXX"). The template engine 114 retrieves these new values and executes the after import program (e.g., XPRA) with the modified values.

Returning to FIG. 2, at step 210, intelligent configuration handler 110 may activate, via a template engine (e.g., template engine 114), the modified one or more templates associated with the data pattern group. A development object (e.g., repository object) may exist as an inactive and an active version. When a new development object is created, it is available first as an inactive version. In its inactive form, the development object may be saved as a database object and is thus part of the repository of a system (e.g., storing applications, components, and libraries). With the activation process, an active version of the development object may be created from an existing inactive version. The active version may be used to generate the runtime version of the development object. At step 212, intelligent configuration handler 110 may store the modified one or more templates in a database (e.g., database 160).

Figure 4:
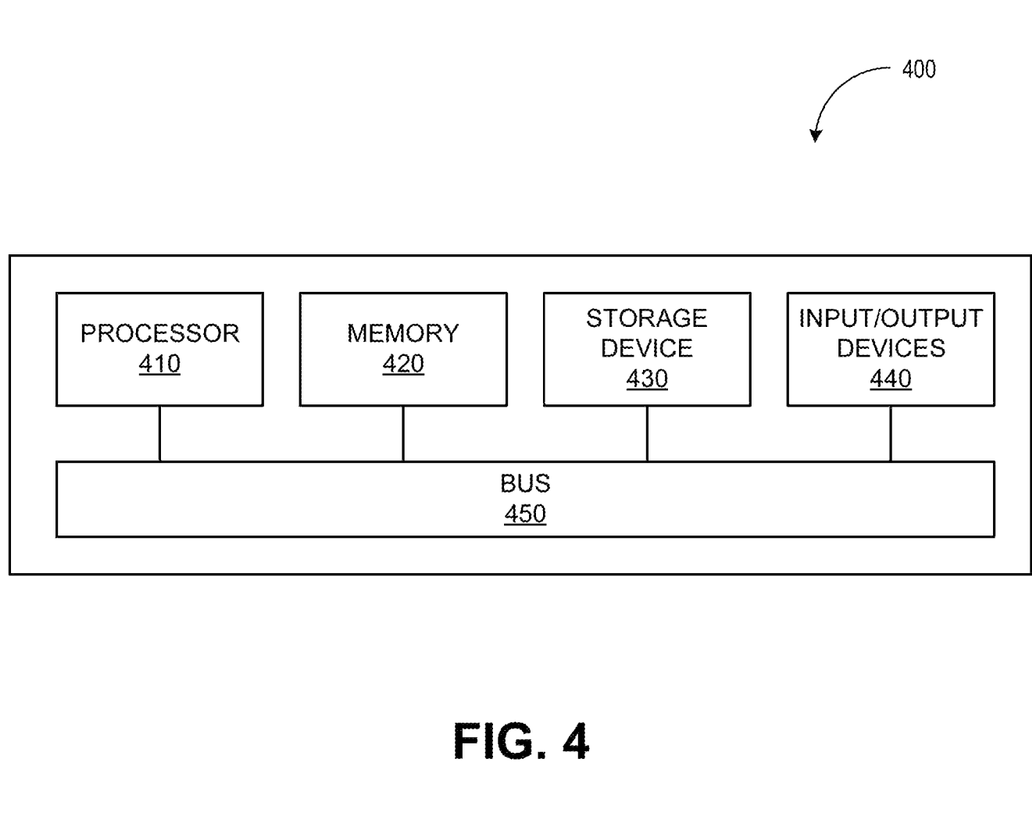
FIG. 4 depicts a block diagram illustrating a computing system, in accordance with some example embodiments.

FIG. 4 depicts a block diagram illustrating a computing system 400 consistent with implementations of the current subject matter. Referring to FIGS. 1-4, the computing system 400 can be used to implement the intelligent configuration handler 110 and/or any components therein.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the intelligent configuration handler 110. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a solid-state device, a floppy disk device, a hard disk device, an optical disk device, a tape device, and/or any other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising:
at least one data processor; and
at least one memory storing instructions, which when executed by the at least one data processor, result in operations comprising:
generating a data pattern group associated with one or more configuration sets, wherein the data pattern group comprises data patterns with one or more wildcard characters;
receiving an input selection, wherein the input selection includes a table name and data pattern information;

selecting values for the data pattern group associated with the one or more configuration sets based on the input selection;

generating modifications to one or more templates associated with the data pattern group by applying the selected values to the one or more templates, wherein applying the selected values to the one or more templates comprises automatically replacing an old data pattern with a new data pattern;

activating, via a template engine, the modified one or more templates associated with the data pattern group; and storing the modified one or more templates in a database.

Example 2: The system of Example 1, wherein receiving the input selection comprises receiving input from a user device.

Example 3: The system of any of Examples 1-2, receiving the input selection comprises receiving input via a structured query language expression.

Example 4: The system of Example 3, wherein the structured query language expression comprises a SELECT condition.

Example 5: The system of any of Examples 1-4, wherein selecting values for the data pattern group comprises selecting values from a table comprising key fields, wherein the key fields identify unique records for a table row.

Example 6: The system of any of Examples 1-5, wherein the data pattern group comprises data patterns with a wildcard character at one or more of: a beginning position, a middle position, or an ending position, of a data pattern.

Example 7: The system of any of Examples 1-6, wherein the one or more configuration sets comprises business configuration data.

Example 8: The system of any of Examples 1-7, wherein the one or more templates associated with the data pattern group comprise configuration templates including predefined instance configurations for specific scenarios.

Example 9: The system of any of Examples 1-8, further comprising:
converting the data pattern group into a predefined format; and
storing the data pattern group in the database.

Example 10: A computer-implemented method, comprising:
generating a data pattern group associated with one or more configuration sets, wherein the data pattern group comprises data patterns with one or more wildcard characters;
receiving an input selection, wherein the input selection includes a table name and data pattern information;
selecting values for the data pattern group associated with the one or more configuration sets based on the input selection;
generating modifications to one or more templates associated with the data pattern group by applying the selected values to the one or more templates, wherein applying the selected values to the one or more templates comprises automatically replacing an old data pattern with a new data pattern;
activating, via a template engine, the modified one or more templates associated with the data pattern group; and
storing the modified one or more templates in a database.

Example 11: The method of Example 10, wherein receiving the input selection comprises receiving input from a user device.

Example 12: The method of any of Examples 10-11, wherein receiving the input selection comprises receiving input via a structured query language expression.

Example 13: The method of Example 12, wherein the structured query language expression comprises a SELECT condition.

Example 14: The method of any of Examples 10-13, wherein selecting values for the data pattern group comprises selecting values from a table comprising key fields, wherein the key fields identify unique records for a table row.

Example 15: The method of any of Examples 10-14, wherein the data pattern group comprises data patterns with a wildcard character at one or more of: a beginning position, a middle position, or an ending position, of a data pattern.

Example 16: The method of any of Examples 10-15, wherein the one or more configuration sets comprises business configuration data.

Example 17: The method of any of Examples 10-16, wherein the one or more templates associated with the data pattern group comprise configuration templates including predefined instance configurations for specific scenarios.

Example 18: The method of any of Examples 10-17, further comprising:
converting the data pattern group into a predefined format; and storing the data pattern group in the database.

Example 19: A non-transitory computer readable medium storing instructions, which when executed by at least one data processor, result in operations comprising:
generating a data pattern group associated with one or more configuration sets, wherein the data pattern group comprises data patterns with one or more wildcard characters;
receiving an input selection, wherein the input selection includes a table name and data pattern information;
selecting values for the data pattern group associated with the one or more configuration sets based on the input selection;
generating modifications to one or more templates associated with the data pattern group by applying the selected values to the one or more templates, wherein applying the selected values to the one or more templates comprises automatically replacing an old data pattern with a new data pattern;
activating, via a template engine, the modified one or more templates associated with the data pattern group; and storing the modified one or more templates in a database.

Example 20: The non-transitory computer readable medium of Example 19, wherein receiving the input selection comprises receiving input from a user device.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions, which when executed by the at least one data processor, result in operations comprising:
   defining a wildcard data pattern group associated with one or more configuration sets, wherein the wildcard data pattern group comprises a data string having one or more wildcard characters;
   receiving an input selection via an automated process responsive to a system upgrade, wherein the input selection includes a name of a database table and data pattern information for retrieving values from the database table;
   selecting values for the wildcard data pattern group from the database table based on the input selection;
   generating a wildcard list for the wildcard data pattern group, wherein the wildcard list stores entries in the wildcard data pattern group with corresponding ones of the selected values;
   generating modifications to one or more templates associated with the wildcard data pattern group, such that the modified one or more templates are compatible with the system upgrade, the generating modifications comprising applying the selected values to the one or more templates and iterating over the wildcard list, the applying of the selected values to the one or more templates comprising automatically replacing data strings matching the wildcard data pattern group with the selected values;
   activating, via a template engine, the modified one or more templates associated with the wildcard data pattern group; and
   storing the modified one or more templates in a database.

2. The system of claim 1, wherein receiving the input selection comprises receiving input via a structured query language expression.

3. The system of claim 2, wherein the structured query language expression comprises a SELECT condition.

4. The system of claim 1, wherein selecting values for the wildcard data pattern group comprises selecting values from a table comprising key fields, wherein the key fields identify unique records for a table row.

5. The system of claim 1, wherein the wildcard data pattern group comprises a data string having a wildcard character at one or more of: a beginning position, a middle position, or an ending position, of a data pattern.

6. The system of claim 1, wherein the one or more configuration sets comprises business configuration data.

7. The system of claim 1, wherein the one or more templates associated with the wildcard data pattern group comprise configuration templates including predefined instance configurations for specific scenarios.

8. The system of claim 1, further comprising:
   converting the wildcard data pattern group into a predefined format; and
   storing the wildcard data pattern group in the database.

9. A computer-implemented method, comprising:
   defining a wildcard data pattern group associated with one or more configuration sets, wherein the wildcard data pattern group comprises a data string having one or more wildcard characters;
   receiving an input selection via an automated process responsive to a system upgrade, wherein the input selection includes a name of a database table and data pattern information for retrieving values from the database table;
   selecting values for the wildcard data pattern group from the database table based on the input selection;
   generating a wildcard list for the wildcard data pattern group, wherein the wildcard list stores entries in the wildcard data pattern group with corresponding ones of the selected values;
   generating modifications to one or more templates associated with the wildcard data pattern group, such that the modified one or more templates are compatible with the system upgrade, the generating modifications comprising applying the selected values to the one or more templates and iterating over the wildcard list, the applying of the selected values to the one or more templates comprising automatically replacing data strings matching the wildcard data pattern group with the selected values;
   activating, via a template engine, the modified one or more templates associated with the wildcard data pattern group; and
   storing the modified one or more templates in a database.

10. The method of claim 9, wherein receiving the input selection comprises receiving input via a structured query language expression.

11. The method of claim 10, wherein the structured query language expression comprises a SELECT condition.

12. The method of claim 9, wherein selecting values for the wildcard data pattern group comprises selecting values from a table comprising key fields, wherein the key fields identify unique records for a table row.

13. The method of claim 9, wherein the wildcard data pattern group comprises a data string having a wildcard character at one or more of: a beginning position, a middle position, or an ending position, of a data pattern.

14. The method of claim 9, wherein the one or more configuration sets comprises business configuration data.

15. The method of claim 9, wherein the one or more templates associated with the wildcard data pattern group comprise configuration templates including predefined instance configurations for specific scenarios.

16. The method of claim 9, further comprising:
    converting the wildcard data pattern group into a predefined format; and
    storing the wildcard data pattern group in the database.

17. A non-transitory computer readable medium storing instructions, which when executed by at least one data processor, result in operations comprising:
    defining a wildcard data pattern group associated with one or more configuration sets, wherein the wildcard data pattern group comprises a data string having one or more wildcard characters;
    receiving an input selection via an automated process responsive to a system upgrade, wherein the input selection includes a name of a database table and data pattern information for retrieving values from the database table;
    selecting values for the wildcard data pattern group from the database table based on the input selection;

generating a wildcard list for the wildcard data pattern group, wherein the wildcard list stores entries in the wildcard data pattern group with corresponding ones of the selected values;

generating modifications to one or more templates associated with the wildcard data pattern group, such that the modified one or more templates are compatible with the system upgrade, the generating modifications comprising applying the selected values to the one or more templates and iterating over the wildcard list, the applying of the selected values to the one or more templates comprising automatically replacing data strings matching the wildcard data pattern group with the selected values;

activating, via a template engine, the modified one or more templates associated with the wildcard data pattern group; and storing the modified one or more templates in a database.

\* \* \* \* \*